Figure 1:
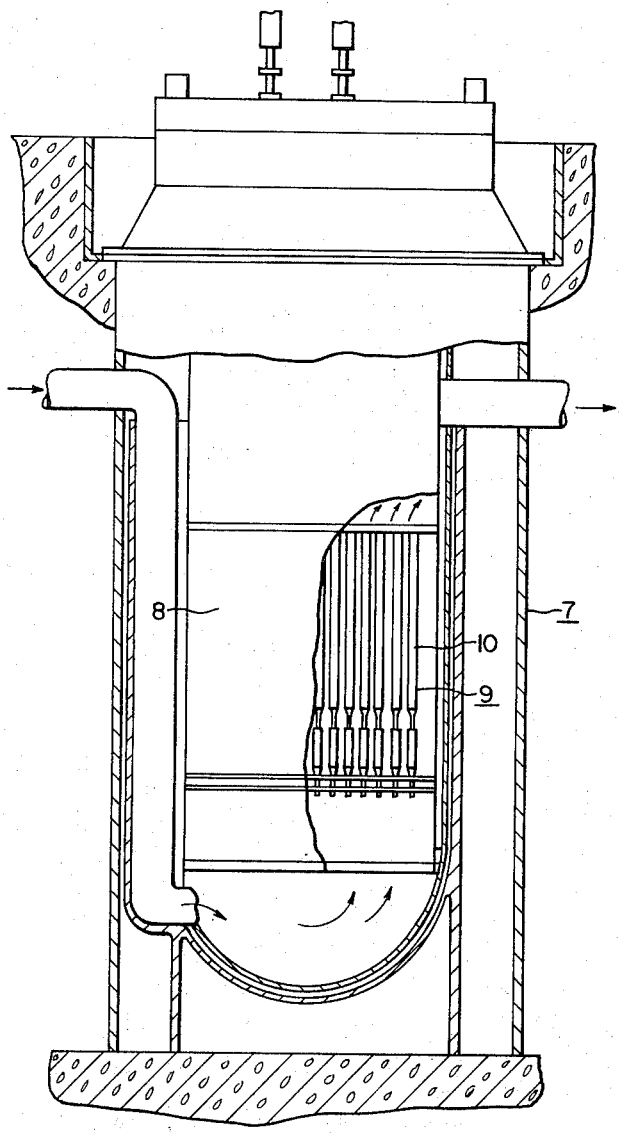
Figure 2:
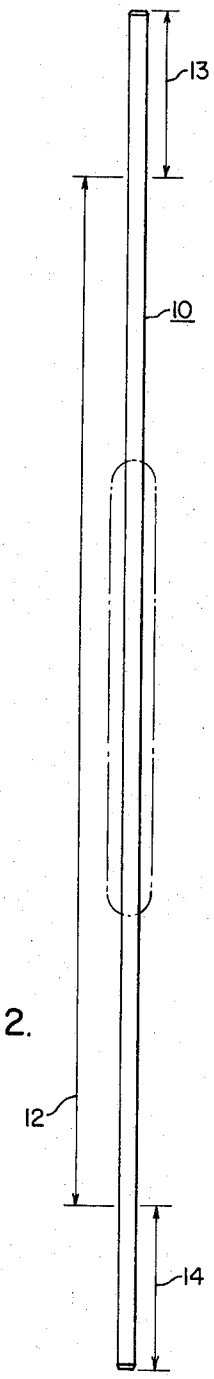
Figure 3:
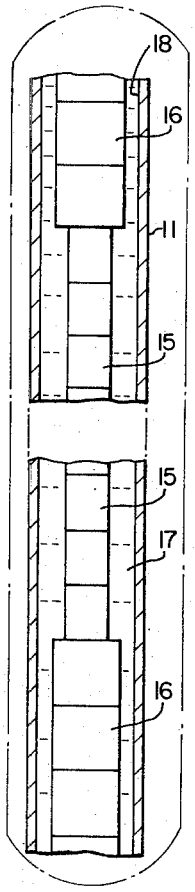
Figure 4:
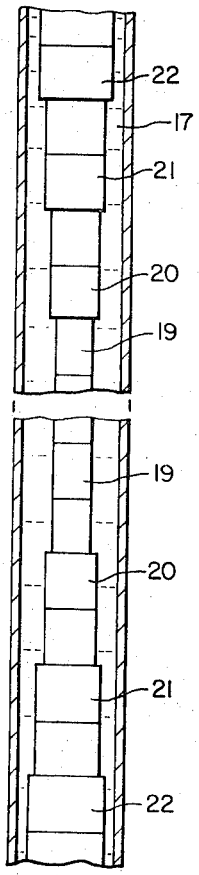
Figure 5:
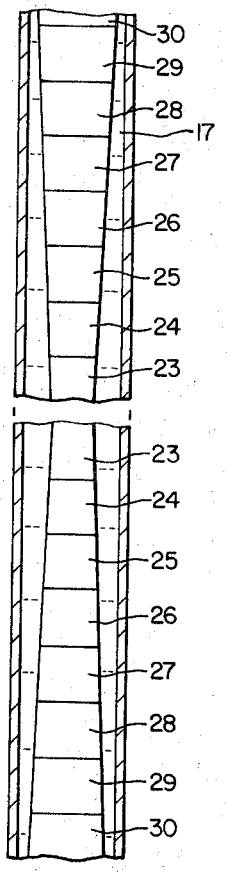
Figure 6:
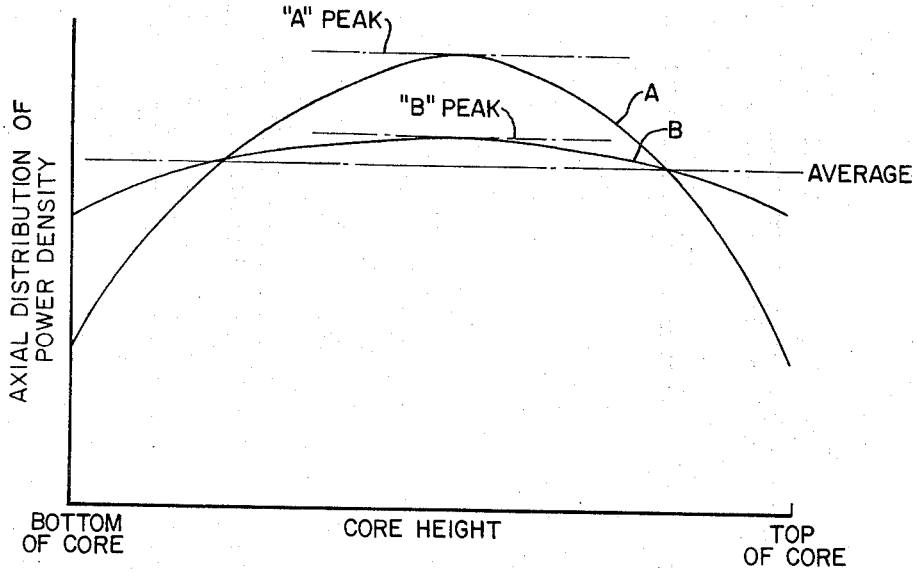

OR T 921,018

A1274E

April 16, 1974 M. W. DYOS T921,018

NUCLEAR REACTOR CORE AND FUEL ELEMENT THEREFOR

Filed Jan. 5, 1973 2 Sheets-Sheet 1

NUCLEAR REACTOR CORE AND FUEL ELEMENT THEREFOR

Filed Jan. 5, 1973 2 Sheets-Sheet 2

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 867

T921,018
NUCLEAR REACTOR CORE AND FUEL ELEMENT THEREFOR

Malcolm W. Dyos, Laughlintown, Pa., assignor to Westinghouse Electric Corporation, Pittsburgh, Pa.

Filed Jan. 5, 1973, Ser. No. 321,407
**Int. Cl. G21c *3/28***
U.S. Cl. 176—18
2 Sheets Drawing. 15 Pages Specification

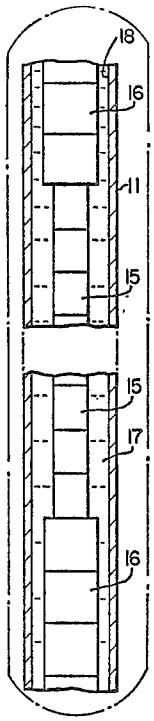

A reactor core including a plurality of metallic clad fuel elements which increase the volume fraction of fuel in the core. The amount of fuel within the cladding along the length of at least some of the fuel elements is matched to the neutron radiation to which the fuel element is exposed. In one example, two different diameters of fuel pellets are used with cladding having a constant inside diameter. The fuel pellet diameter is larger in the upper and lower regions of the core as compared to the fuel pellet diameter in the center region of the core. A layer of liquid metal serves as a bond between the varying outer diameter of fuel pellets and the constant inner diameter of the cladding.